A. SIMANDL.
AUTOMOBILE FENDER.
APPLICATION FILED APR. 8, 1914.
1,126,106.
Patented Jan. 26, 1915.
2 SHEETS—SHEET 1.
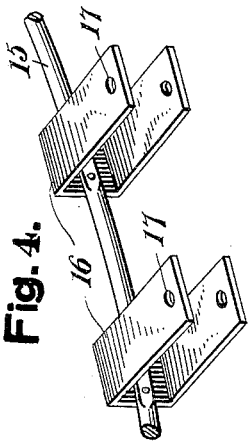
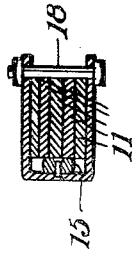
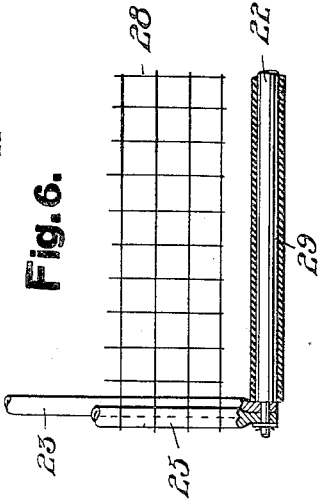
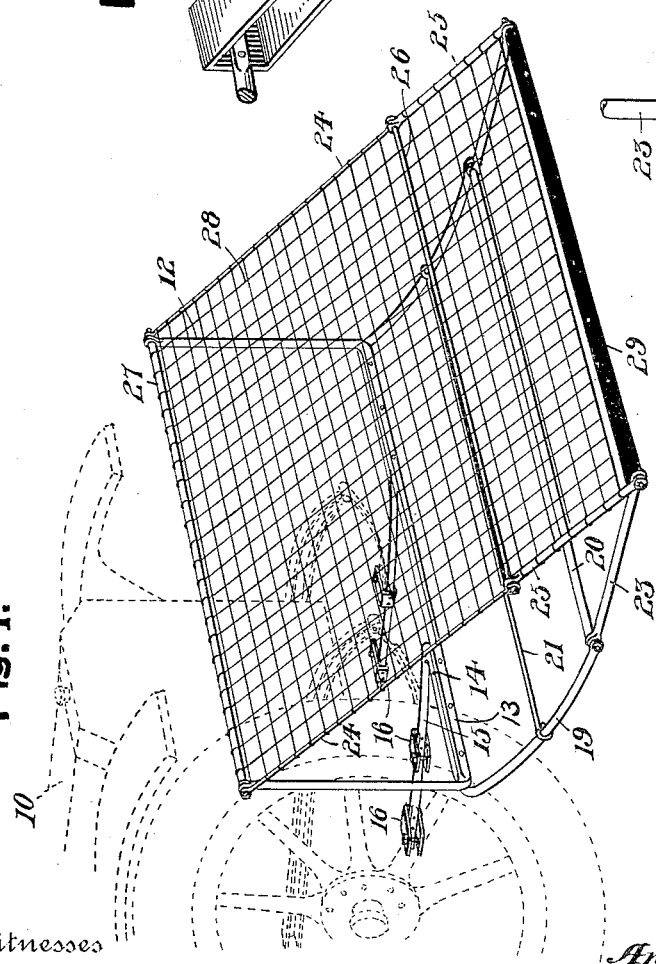
Witnesses
Gussie Notes
T. W. F. Bryant
Inventor
Anthony Simandl
By A. M. Wilson
Attorney A. SIMANDL.
AUTOMOBILE FENDER.
APPLICATION FILED APR. 8, 1914.
1,126,106.
Patented Jan. 26, 1915.
2 SHEETS—SHEET 2.
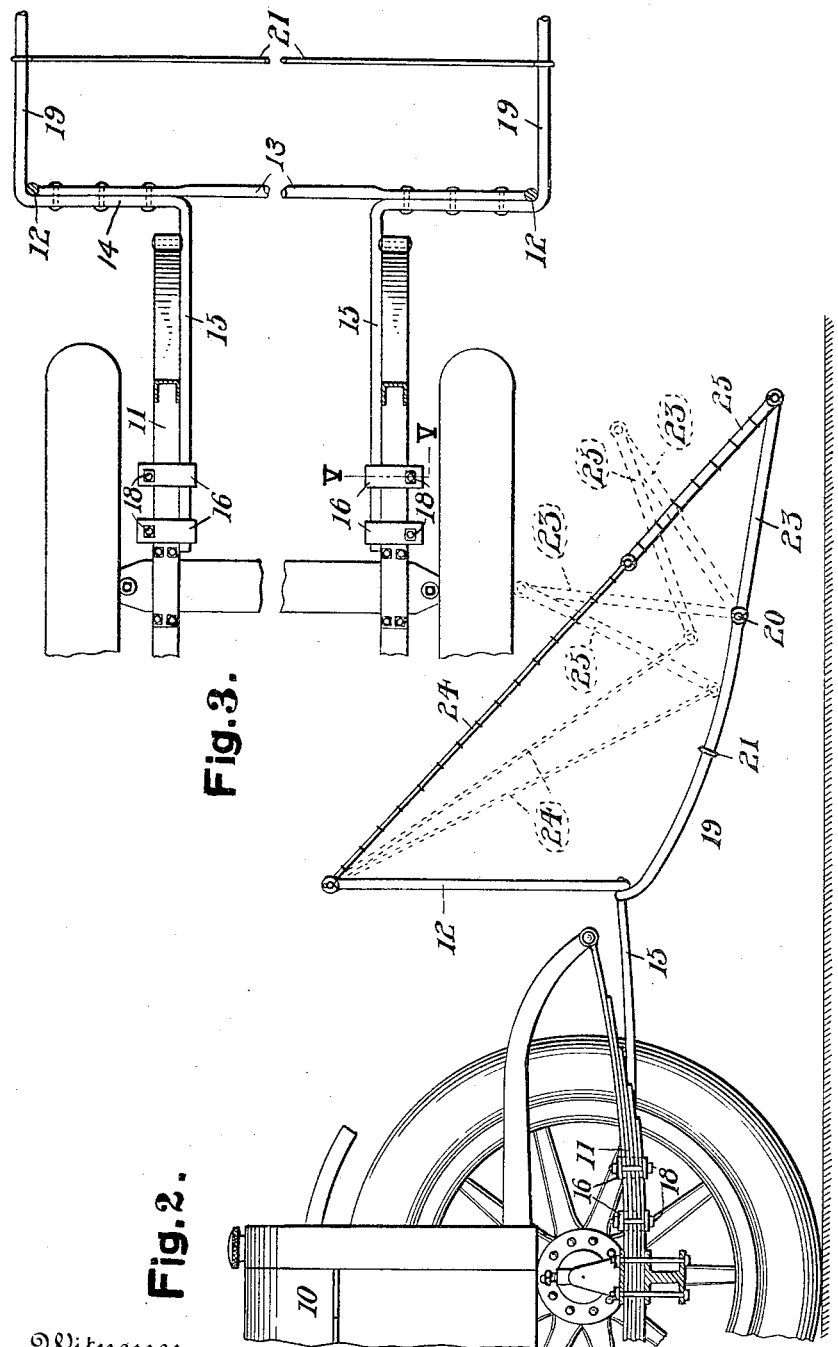
Witnesses
Gussie Notes
T. K. Bryant
Inventor
Anthony Simandl
By
Attorney

UNITED STATES PATENT OFFICE.

ANTHONY SIMANDL, OF NORTON, VIRGINIA.

AUTOMOBILE-FENDER.

1,126,106.                    Specification of Letters Patent.       Patented Jan. 26, 1915.

Application filed April 8, 1914.   Serial No. 830,402.

*To all whom it may concern:*

Be it known that I, ANTHONY SIMANDL, a subject of the Emperor of Austria-Hungary, residing at Norton, in the county of Wise and State of Virginia, have invented certain new and useful Improvements in Automobile-Fenders, of which the following is a specification.

This invention relates to new and useful improvements in automobile fenders.

The primary object of this invention is to provide a light serviceable fender to be positioned forwardly of an automobile and adapted to partially close in the event of striking any object and to retain such objects upon the fender.

A further object is to provide an automobile fender having a catching net for objects that may be struck by the fender and of such a form as to fold upon itself in a resilient manner upon coming in forcible contact with any object.

A still further object is to provide a resilient net carrying foldable fender frame which will be inexpensive to manufacture and light in weight, although highly efficient in preventing any injury to persons or objects which are struck thereby, by reason of being positioned within the direct line of travel of the automobile upon which the fender is installed.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a perspective view of the device illustrated, as mounted upon the forward portion of an automobile, the automobile being shown in dotted lines. Fig. 2 is a sectional view taken through the front axle of an automobile, the remaining portions thereof being shown in side elevation and having the invention mounted thereon. Fig. 3 is a detail view of a portion of the forward part of an automobile and showing the fender clamped to the forward leaf springs, parts of the members being broken away. Fig. 4 is a detail perspective view of one of the securing brackets by which the fender is mounted upon the automobile springs. Fig. 5 is a transverse sectional view taken upon the line V—V of Fig. 3, and Fig. 6 is a detail of the plan view of one corner of the fender with portions thereof broken away.

Referring more in detail to the drawings, the improved fender is illustrated as positioned forwardly of the automobile 10 and entirely mounted upon and supported by the forward leaf springs 11.

In the formation of the fender a rectangular frame 12 is employed having secured to the bottom rail 13 thereof the angular brackets 14. Rearwardly extending arms 15 of said angular brackets are provided with U-shaped clips 16 opening outwardly and adapted for inclosing the forward springs 11 while the alining perforations 17 of said clips have locking bolts 18 positioned therethrough whereby the angular brackets are rigidly mounted to the automobile. The angular brackets 14 are provided with forwardly extending opposite and substantially parallel arms 19 having their ends connected together by a bar 20, while an intermediate rod 21 is also positioned between said arms 19 for strengthening the same. Forwardly of said bar 20, and parallel therewith, a similar bar 22 is mounted and pivotally connected thereto by means of the side arms 23. Upper side rods 24 and lower side rods 25 are hinged together upon a cross rod 26, while the free ends of said rod are pivoted respectively to the top bar 27 of the frame 12 and the front bar 22.

A netting 28, preferably formed of metal, is stretched upon the frame formed by the end members 22 and 27 and the side members 24 and 25 while the front bar 22 is provided with a rubber cover 29.

The side rods 24 and 25 being hinged together and hingedly mounted between the upper and lower members 22 and 27 respectively, and the arms 23 being hingedly mounted upon the bar 20, it will be evident that when a person or an obstruction is encountered by the cushion member 29 during the course of travel of the automobile, the net 28 will receive such person or obstruction, thereby cushioning its fall, while the forward portion of the fender will move upon the several hinged connections and assume substantially the positions illustrated in dotted lines in Fig. 2 and in which positions the object mounted upon the fender will be prevented from falling off of the same. By such means a resilient cushion bar is mounted upon the automobile, offering slight resiliency to any contacted objects, while the fender may be readily folded to the positions shown in dotted lines in Fig. 3 and returned to its normal open operative position, as shown in full lines therein. The fender with its mounting brackets may be readily removed by withdrawing the locking bolts 18 from the securing clips 16.

While the forms of the invention herein shown and described are what are believed to be preferable embodiments thereof, it is nevertheless to be understood that minor changes may be made in the form, proportion and details of construction without departing from the spirit and scope of the invention set forth in the appended claims.

What I claim is:—

1. A fender comprising a frame-work adapted to be mounted upon an automobile, forwardly-projecting bars hinged to said frame-work, a cushion member located between the free ends of said bars, hinged side rods mounted between the upper portion of said frame-work and said cushion member, a screen normally inclined and connected between said side rods, the forward portion of said screen together with said cushion member and arms being adapted for folding rearwardly when pressure is exerted upon said cushion member, oppositely disposed angle brackets secured to the lower bar of said frame, and clips on said brackets for removably attaching said frame-work to an automobile.

2. A fender comprising a rectangular frame adapted to be mounted in substantially vertical position upon an automobile, oppositely-disposed angular brackets secured to the lower portion of said frame and having forward and rear extensions, mounting clips upon said rear extensions, a bar connecting the forward ends of said forward extensions, arms hinged to said bar, a resiliently surfaced cushion member secured between the forward free ends of said arms, side rods oppositely positioned and hinged together and having their ends hinged between the outer ends of said cushion member and the upper portion of said rectangular frame, a screen secured between said side rods and said upper portion of the rectangular frame, the said screen being adapted for angular bending upon a relative movement between the said hinged members.

In testimony whereof I affix my signature in presence of two witnesses.

ANTHONY SIMANDL.

Witnesses:
H. G. GILMER,
G. A. SMITH.

Copies of this patent may be obtained for five cents each, by addressing the "Commissioner of Patents, Washington, D. C."